Figure 1:
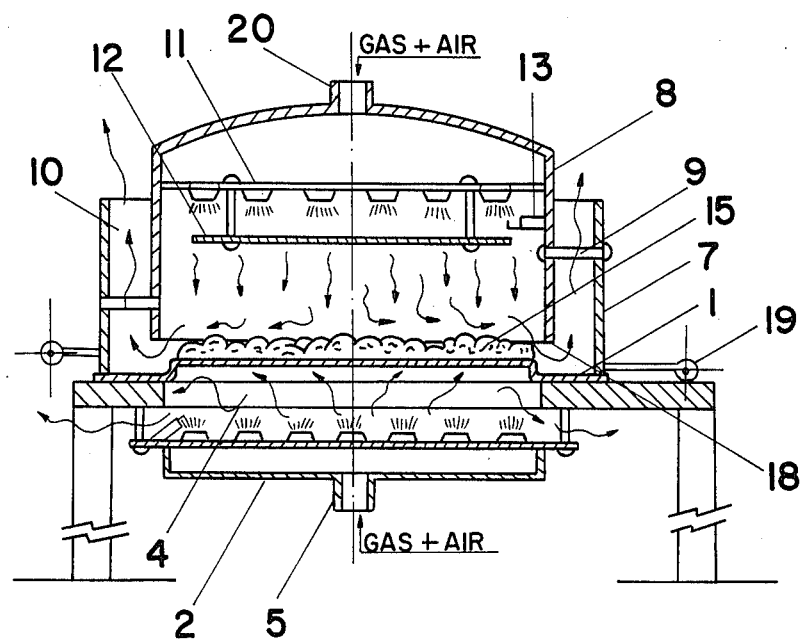

United States Patent [19]

Colangelo et al.

[11] Patent Number: 4,776,319

[45] Date of Patent: Oct. 11, 1988

[54] EQUIPMENT FOR THE CONTROLLED AND UNIFORM COOKING OF FOODS OF LESSER THICKNESSES

[76] Inventors: Emiddio Colangelo; Antonio J. Colangelo, both of Av. Leôncio de Magalhaes, 1500,, 02042 Sao Paulo, SP; Jûlio B. Filho, Rua Regina Badra, 102,, 04641 Sao Paulo, SP, all of Brazil

[21] Appl. No.: 15,140

[22] PCT Filed: May 7, 1986

[86] PCT No.: PCT/BR86/00006

§ 371 Date: Jan. 16, 1987

§ 102(e) Date: Jan. 16, 1987

[87] PCT Pub. No.: WO86/06602

PCT Pub. Date: Nov. 20, 1986

[30] Foreign Application Priority Data

May 17, 1985 [BR] Brazil ................... 8502478

[51] Int. Cl.⁴ .................. A47J 37/00; F24C 3/00
[52] U.S. Cl. .................. 126/41 R; 99/357; 99/389; 126/39 J; 126/39 C; 126/39 K; 126/214 D; 426/523
[58] Field of Search ........ 126/39 C, 39 J, 39 K, 126/41 R, 92 B, 211, 214 D; 219/352, 396, 405, 411; 99/389, 357; 426/243, 523

[56] References Cited

U.S. PATENT DOCUMENTS

| | | | |
|---|---|---|---|
| Re. 24,296 | 3/1957 | Stewart | 126/41 R |
| 1,366,686 | 1/1921 | Zweily | 126/39 C |
| 2,832,331 | 4/1955 | Schwank | 126/41 R |
| 3,236,998 | 2/1966 | Wertheimer et al. | 219/352 |
| 4,188,937 | 2/1980 | Baynes | 126/41 R |
| 4,374,319 | 2/1983 | Guilbert | 219/405 |

FOREIGN PATENT DOCUMENTS

| | | |
|---|---|---|
| 530971 | 1/1922 | France . |
| 1004526 | 3/1952 | France . |
| 469474 | 4/1969 | Switzerland . |
| 911013 | 11/1962 | United Kingdom . |

Primary Examiner—George Yeung
Attorney, Agent, or Firm—Cushman, Darby & Cushman

[57] ABSTRACT

Equipment for the controlled and uniform cooking of foods of lesser thickness so that cooking occurs uniformly on the whole upper surface of the food and uniformly on the whole lower surface of the food comprising a base having a hole; a lower burner disposed below the hole; a heat conducting plate disposed over the hole, a lower surface of food resting on the plate being uniformly cooked by the thermal conduction from the lower burner through the plate; a chamber having an open bottom spaced from the plate; an upper burner disposed in the chamber; a fume deflector device mounted to the chamber and mounted between the upper burner and the heat conducting plate for deflecting and evenly distributing hot fumes generated by the upper burner so that a uniform column of hot fumes descends vertically toward the heat conducting plate and strike perpendicularly over an upper surface of food resting on the plate; and a deflector ring encircling and concentric with the chamber and having a lower end in contact with at least one of the plate and the base, the deflector ring being spaced from and mounted to the chamber so as to define an annular-shaped gap therebetween, whereby hot fumes, after striking the surface of food resting on the plate, are conveyed away from the plate.

5 Claims, 5 Drawing Sheets

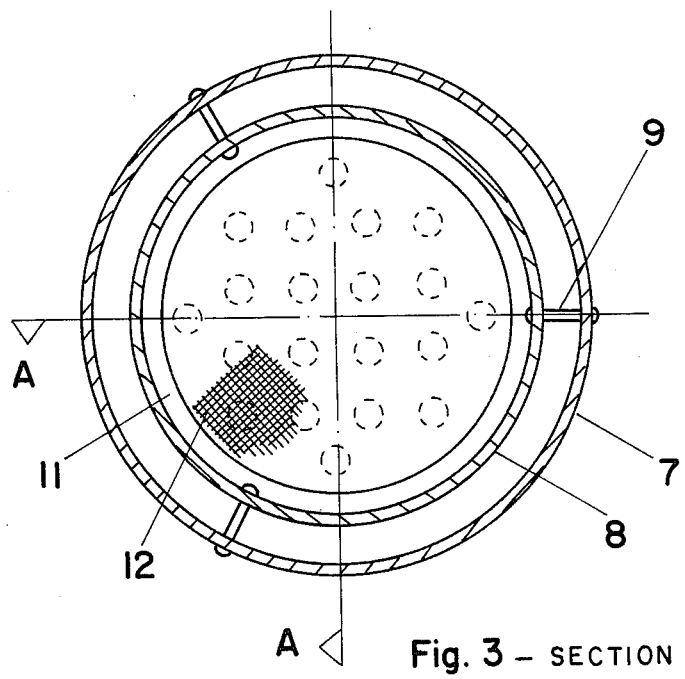
Fig. 3 — SECTION B-B
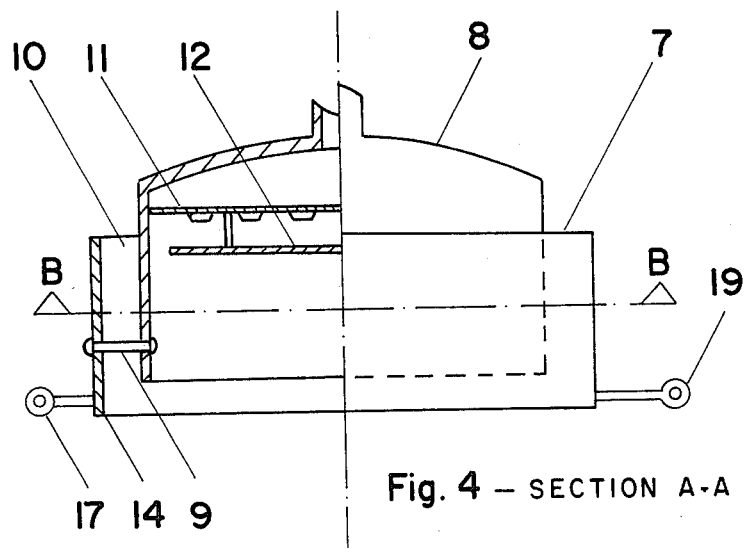
Fig. 4 — SECTION A-A

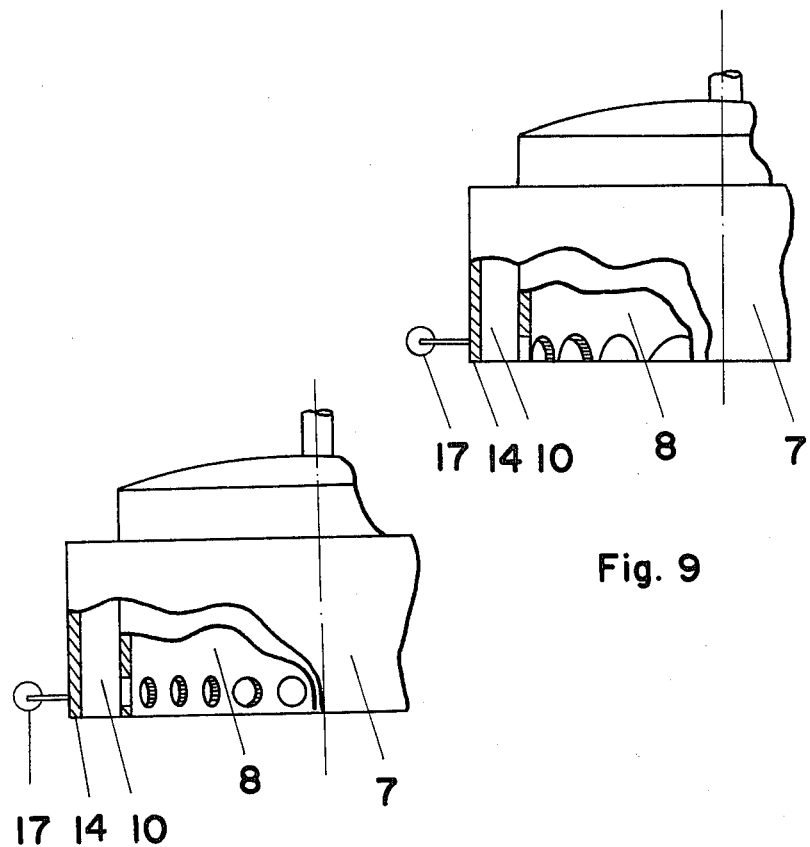
Fig. 9
Fig. 10
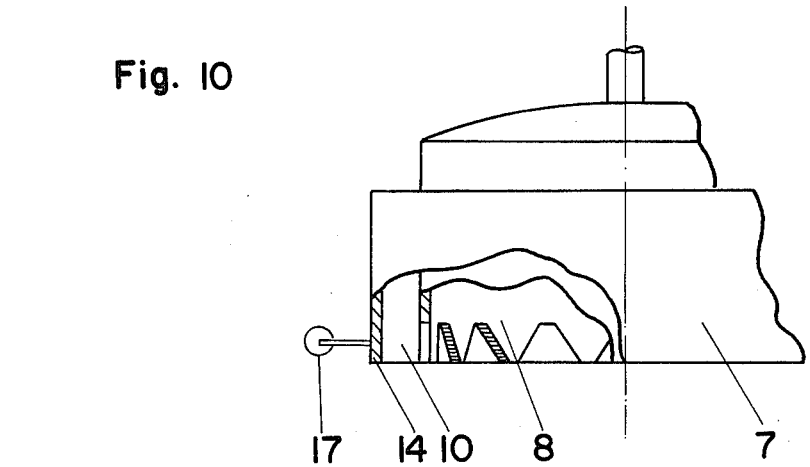
Fig. 11

EQUIPMENT FOR THE CONTROLLED AND UNIFORM COOKING OF FOODS OF LESSER THICKNESSES

The present invention refers to a process and equipment to cook, roast, brown and to carry out other cooking operations, in a uniform and rapid manner, of the complete upper surface of foods of lesser thicknesses in such a way that all points of this surface attain the same degree of cooking and the same occurs at all points of the lower surface, also allowing that the degree of cooking to be reached by the two surfaces be the same or, if necessary, different.

The cooking processes, as known today, started with the archaic reverberatory wood stove, which required constant movement by rotation or shifting of the foodstuff on the heating surface in order to try and obtain uniform cooking between the upper and lower surfaces as well as uniform cooking at all points of the same surface. This movement is necessary because this type of oven gives a horizontal motion of the hot fumes, produced by the flame, towards the flue located in the opposite position sweeping over the surface of the food in only one direction. This oven, of low thermal output is anti-economic, besides requiring a specialized operator looking after it continuously, has the only advantage of providing quick cooking at the expense of an enormous waste of thermal energy.

Gas stoves, where all the heat is produced inside a chamber by means of one or more burners have, in common, the characteristic of mixing the fumes and heat from the various burners so that the circulation of the fumes and vapours, acting in accordance with the laws for the natural rising of hot fumes, result in the formation of heterogeneous rising columns giving non-uniform cooking between the outer surface and the centre and between the upper and lower parts of the foodstuff, a condition proven in the new models of ovens which are provided with turbines and/or ventilators so as to cause a turbulence to the rising fumes in an attempt to obtain a uniform distribution of the heat for uniformity in cooking.

Even electric ovens present problems with respect to the uniformity in the cooking. The type with a metallic chamber of low thermal inertia requires the use of turbines or homogenizing ventilators because the formation of the ascending column is its negative characteristic, analogous to the previous case above mentioned. Those of a high thermal inertia type with resistances outside the refractory chamber, are also deficient with regard to uniformity and, equal heating between the upper and the lower part, which is in contact with the base plate, is difficult because the sequence of cooking successive pieces provokes cooling of the base plate which, due to its poor conductivity associated with the unfeasibility of very high momentary potentials, does not allow the base plate to regain the temperature after being cooled by the piece being removed.

Micro-wave ovens also require, in order to obtain uniform cooking, constant movement of the foodstuff during cooking, this being corroborated in that the latest models are equipped with a motorized rotating plate, so as to move the food during the time it is being cooked.

Besides, this type of oven does not roast or brown the foodstuffs.

On the other hand, every type of oven now existing destined for the cooking of foodstuffs has access to the interior of the oven by means of a vertical front door which facilitates the introduction and removal of the material to be cooked; however, they are deficient as to the uniformity of cooking since the existence of the door in this position always causes, even on a small scale, more intensive cooking in the zone farthest from the door.

It is the object of the present invention to eliminate the inconveniences, mentioned above, of the processes and equipments for cooking actually being used and to obtain quicker cooking even with low potential, besides very high thermal and economic yield dispensing with any handling of the foodstuff during cooking and doing without a special operator. These objectives are attained with the process now developed and the respective equipment, which is not a mere improvement of those existent but a substantially new development.

In the process of the present invention, the heating of the upper portion of the foodstuff is accomplished by a descending, vertical and homogeneous (thermally and dynamically fluid) column of hot fumes and by infra-red radiation. Both the descending column of hot fumes and the infra-red radiation of uniform superficial density, are furnished by a gas burner and its respective fume deflector, located necessarily inside and in the upper part of the chamber, which is closed on top and open on the bottom. In this way, the column is obliged to descend and reach perpendicularly the top face of the foodstuff placed next to the horizontal opening of the chamber and in a horizontal position, when and where there is the transfer of heat from the fumes to the upper face of the food which in turn forces the fumes, at point of contact with the foodstuff, to take a radially horizontal path until they leave the chamber by the outside walls this being the only possible escape and where an annular deflector sends the fumes upwards and out to the atmosphere.

Since the pressure exercised by the hot fumes in the upper part of the chamber (where it is closed), is greater than the atmospheric pressure it becomes necessary that the gas/air blender which supplies the burner, has the capacity to overcome this counter-pressure against the flame, thus requiring a mixer of the Venturi type of good efficiency which can also be aided by an outside exhaust deflector ring, if this has sufficient height to contribute to the removal of the fumes, thus constituting an annular chimney concentric with the chamber.

This process of heating by a jet, directed perpendicularly to the surface of the foodstuff placed in a horizontal position, gives to the cooking of the upper part of the foodstuff exceptional characteristics of uniformity, because the hot fumes, after giving up their heat to the food, are themselves deviated in a direction perpendicular to the initial and routed to the outside of the chamber where they leave in a uniform stream, that is, in constant discharge at all points on the outside at the mouth of the chamber.

As regards cooking of the lower part of the foodstuff, the process consists in heating this by an external and consequentially independent burner, by means of a high thermal conductivity plate which supports the foodstuff and is placed horizontally next to the horizontal opening of the above-mentioned oven, functioning also as a tray, base plate and door of the oven, simultaneously.

The equipment to carry out the process of the present invention is made up of two sets and one piece, as follows:

one set which we will call the oven;
another set which we will call the external heater;
one piece which is the supporting tray for the foodstuff being at the same time the base plate and door of the oven for it carries out these various functions simultaneously.

The set denominated oven is constituted essentially of:

a chamber with a horizontal opening on the bottom;
a gas/air mixture burner;
a flame deflector and also an infra-red radiation emitter;
an external vertical deflector ring, open at both extremities, when the oven remains open.

The equipment denominated external heater set of the oven door, also called lower set is essentially made up of:

a horizontal table, with a lid open in the centre to act as a bed for the tray;
a burner located below the lid of the table centered with the opening in the lid.

The equipment completed in working position presents its three components described above, placed together in the following manner top to bottom: the oven is placed over the tray which supports the foodstuff and this is centered and resting on its bed over the external heater set.

This and other characteristics of the process and its respective equipment, object of this present invention, besides its advantages will be made evident in greater detail in the description that follows which is given as a non-restrictve example, and through the attached drawings which are also non-restrictive, in which:

FIG. 1 - Schematically illustrates, in cross section, the complete equipment mounted in the closed position (working position).

Figure 2:
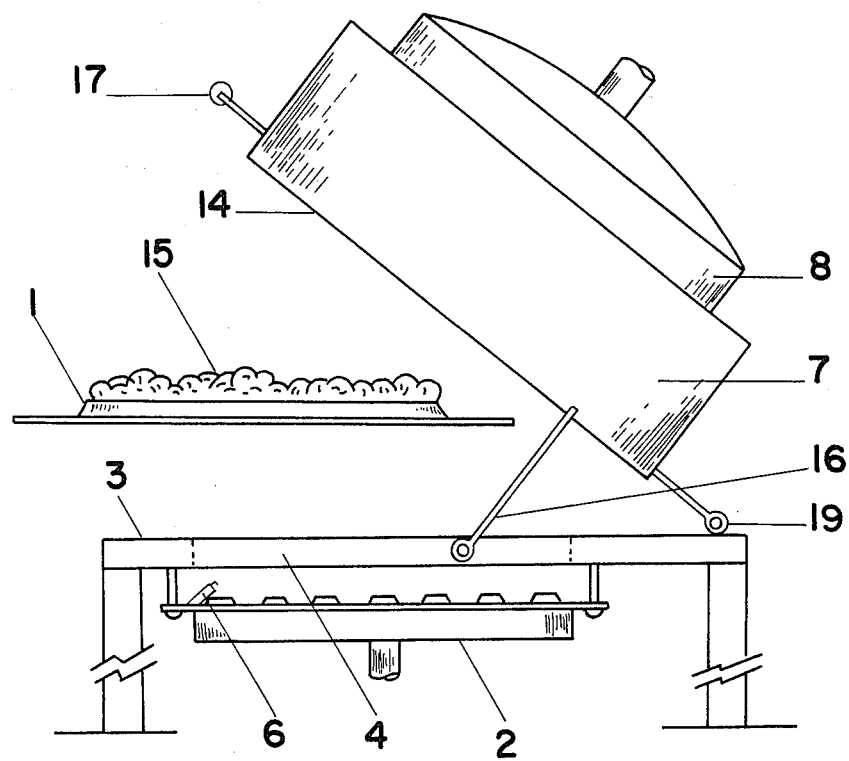

FIG. 2 - Shows in a lateral view, the complete equipment in the open position, with the tray out of position.

FIG. 3 - Shows in cross section the upper part of the oven.

FIG. 4 - Shows in a partial cross section one of the many possible forms of the equipment denominated oven.

Figure 5:
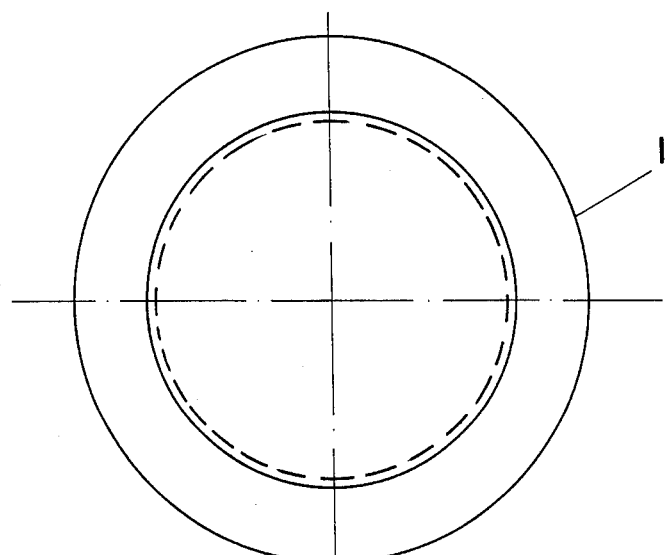

FIG. 5 - Illustrative plan of one of the many possible forms of the food carrying tray.

Figure 6:
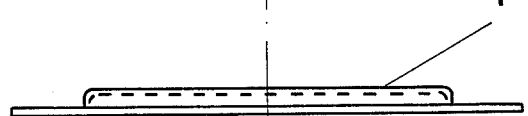

FIG. 6 - Lateral view of the food carrying tray, shown in FIG. 5.

Figure 7:
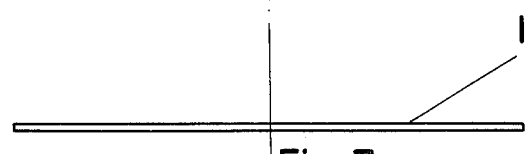

FIG. 7 - Lateral view of one of the possible forms for the food carrying tray.

Figure 8:
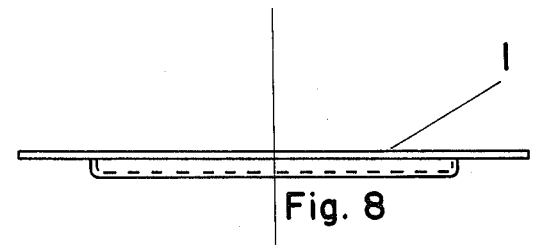

FIG. 8 - Lateral view of another possible form for the food carrying tray.

FIG. 9 - Illustrates in a partial cross section one of the many possible forms of the mouth of the oven's chamber.

FIG. 10 - Shows a partial cross section of another of the possible multiple forms of the mouth of the oven's chamber.

FIG. 11 - Shows a partial cross section of another example of the possible multiple forms of the mouth of the oven's chamber.

The external heater set of the tray, door and base plate (1) of the oven (shown in FIGS. 1 and 2) is a fixed set constituted of one burner (2), with flame directed upwards, located and fixed firmly, at a convenient distance, in the lower part of the table top (3). Besides this, the centre of the burner (2) is located on the vertical which passes through the centre of the hole (4) of the table top (3). This burner (2) receives by means of a tube (5) a gas/air mixture in stechiometric proportion or with an excess of up to 20% of air coming from a mixer, for example of the Venturi type, fed and controlled by a pressure regulator and its respective manometer connected to a solenoid valve commanded by a timer, instruments sufficiently well known and not shown. Ignition is produced by a spark plug (6), the spark of which is provoked by a conventional sparker and is also controlled by the timer, all mentioned and not shown.

FIGS. 3 and 4 show one of the possible forms of the set denominated oven, where we can see the external deflector ring (7) which encircles concentrically and at a small distance from the lower surface of the chamber (8) and firmly fixed to it by means of spaced bolts (9). This concentric association between the chamber (8) and the external deflector ring (7) determines the annular-shaped gap (10) between them, through which gap the fumes and vapours are expelled from the chamber (8). As shown in FIG. 1 the heating inside the chamber (8) is done by a burner (11), located obligatorily in its upper part. If the flame produced by this burner (11) is directed downwards it is necessary to have a fume-deflector (12) whose purpose is to provoke turbulence and homogenization of the descending column of hot fumes and concomitantly produce infra-red radiation. If, optionally, the flame is directed in any other direction which is not down. The presence of the fume-deflector (12) may not be necessary. However, the thermal output will be prejudiced and considerably diminished. The supply of the gas/air mixture for this burner (11) is made through the tube (20) and in the manner and proportions identical to those of the external burner (2) already mentioned, but independently of it. In the same way, ignition is made by means of a spark plug (13), whose sparking is produced and controlled by the same equipment of the external burner already described and not shown.

FIG. 1 shows the coupling of the oven proper with the tray (1) and the external burner kit. In this situation, the food carrying tray (1) has multiple functions, serving at the same time as the entrance to the oven, base plate of the oven and closure of the lower opening (14) of the external deflector ring (7). The coupling between the oven and the external burner kit is made, for example, by means of an articulation in the form of a hinge (19) located in the back section of the top (3) of the table which makes possible the rotation of the oven around the horizontal axle of the hinge (19), once the handle (17) is manipulated. The oven remains in the open position as shown in FIG. 2 by means of the prop (16).

As illustrated in FIGS. 1 and 2 with the tray (1) carrying the food (15) already in working position, centralized in the hole (4) of the top (3) the prop (16) is removed and the oven is lowered by the handle (17) until it rests on the aforesaid tray (1). At this stage the upper burners (11) and the lower burner (2) are lit and cooking of the food (15) starts. Its upper part is cooked exclusively and uniformly through the action of the descending hot fumes and it is possible also to associate this with or without the action of infra-red radiation. The descending hot fumes after striking the food (15) are deflected by the same to the periphery of the entrance (18) of the chamber (8) where they exit horizontally being then deflected by the external deflector ring (7) and expelled vertically upwards through the annular-shaped gap to the outside atmosphere. When associated with cooking by infra-red radiation, this will be produced by heating the deflector (12) located below the flame of the burner (11). This uniform density radiation can be regulated in intensity by varying the distance of the deflector (12) from the flame. The lower part of the food (15) is cooked exclusively by the hot fumes of the lower burner (2) which transfers its heat to the bottom part of the tray (1), made of good heat-conducting material.

This particular set-up assures that there isn't any interference between the hot fumes coming from the two distinct heat sources, as well as clearly defining the separate zones for the cooking of the food (15) which is provided by the tray (1).

Once the pre-determined time has elapsed, the timer deactivates the solenoid valve which, in turn, shuts off the passage of gas thus shutting off all burners (11) and (2).

Lifting up the oven by means of the handle (17) and fixing it in an open position as shown in FIG. 2 using the prop (16), the tray with the food (15) already cooked is removed. The equipment is ready to receive a new lot of uncooked food and to repeat the work cycle.

The process and equipment for the controlled and uniform cooking, of foods of lesser thicknesses, of the present invention offers the following advantages over present systems:

produces absolutely uniform cooking to all parts of every surface of the food;

the upper and lower surfaces are cooked equally and when necessary, cooked unequally by the equipment due to its exclusive characteristic of presenting independence of action and effect by the two heat-generating sources—one by means of a descending column of fumes and infra-red radiation over the upper surface of the food and the other external, heating the lower part of the food exclusively by conduction through a thermally conductive plate;

in the specific case of foodstuffs which have substantially different compositions between the upper and lower layers, that is, asymmetric(al) as to the degree of hydration, as for example, the presence of sauces on a layer of dough of fermented wheat flour, we get controlled and adequate cooking in spite of the heterogeneous make-up of the materials used, not only by regulation of the burners but by varying the percentage of emission of infra-red radiation, exclusive characteristic of this equipment;

one important advantage of this equipment is that it cooks in less time than existing equipment. To achieve the same type of cooking in an existing oven takes, for example, 10 to 20 minutes whilst the equipment of this invention will do this in about 90 seconds. This enormous reduction in cooking time confers, in certain cases, greater appetizing properties than with slower cooking, besides a considerable economy of fuel, chiefly when the equipment is used in industrial activities where time is money;

this process and equipment for heating gives high thermal yield and consequently economy, propitiated by its various characteristics:

(a) when the arrangement of the external deflector ring (7) which encircles all the chamber (8) acts to minimize the heat loss from the wall of the chamber since in this way the external wall of the chamber (8) is heated by the fumes which flow through the annular gap (10) having, however, a small temperature gradient between the internal and external wall surfaces of the above-mentioned chamber;

(b) through the fact that the heat of the descending fume column is transferred obligatorily to the food, almost in its entirety, before leaving the chamber (8).

(c) the low calorific capacity of the apparatus allows thermal equilibrium to be reached in about 60 seconds which clearly demonstrates that the quantity of heat absorbed by the equipment mass is minimal, concluding therefore that the overall heat loss is a minimum;—besides this, the equipment is extremely light making it easily transportable, of simple and economic construction and not requiring a specialized person to operate it.

Naturally, the invention disclosed above is not limited to the procedures described and illustrated and can be fully varied and modified in the construction of the various component parts, without losing its technical characteristics.

We claim:

1. Equipment for the controlled and uniform cooking of foods of lesser thickness so that cooking occurs uniformly on the whole upper surface of the food and uniformly on the whole lower surface of the food, comprising:

a base having a hole;

a lower burner disposed below said hole;

a heat conducting plate disposed over said hole, a lower surface of food resting on said plate being uniformly cooked by thermal conduction from said lower burner through said plate;

a chamber having an open bottom spaced from said plate;

an upper burner disposed in said chamber;

a fume deflector means mounted to said chamber and mounted between said upper burner and said heat conducting plate for deflecting and evenly distributing hot fumes generated by said upper burner so that a uniform column of hot fumes descends vertically toward said heat conducting plate and strike perpendicularly over an upper surface of food resting on said plate; and a deflector ring encircling and concentric with said chamber and having a lower end in contact with at least one of said plate and said base, said deflector ring being spaced from and mounted to said chamber so as to define an annular-shaped gap therebetween, whereby hot fumes, after striking the surface of food resting on said plate, are conveyed away from said plate.

2. Equipment as in claim 1 wherein said fume deflector means provokes turbulence and homogenization of hot fumes generated by said upper burner.

3. Equipment as in claim 2 wherein said deflector means includes means for producing infrared radiation upon exposure to hot fumes from said upper burner.

4. Equipment as in claim 1 further comprising:

means, connected between said base and said deflector ring and said chamber, for allowing said deflector ring and said chamber to pivot away from said base; and means for propping said deflector ring and said chamber while pivoted away from said base.

5. Equipment as in claim 1 further comprising means for producing sparks disposed near said lower burner and said upper burner.

* * * * *

UNITED STATES PATENT AND TRADEMARK OFFICE
CERTIFICATE OF CORRECTION

PATENT NO. : 4,776,319

DATED : October 11, 1988

INVENTOR(S) : COLANGELO et al.

It is certified that error appears in the above-identified patent and that said Letters Patent is hereby corrected as shown below:

On the Title Page correct the third listed inventor's name

[76] to read -- Julio Bertasi, Filho --

Signed and Sealed this

Twenty-fourth Day of October, 1989

Attest:

DONALD J. QUIGG

Attesting Officer

Commissioner of Patents and Trademarks